H. D. PERKY, DEC'D.
L. SPARKS, ADMINISTRATOR.
PROCESS OF MANUFACTURING CEREAL FOOD.
APPLICATION FILED JAN. 19, 1906.

1,064,164.

Patented June 10, 1913.

Witnesses
Stuart Hilder.
George M. Anderson.

Inventor
Henry D. Perky
By E. W. Anderson
his Attorney

UNITED STATES PATENT OFFICE.

HENRY D. PERKY, OF GLENCOE, MARYLAND; LABAN SPARKS, ADMINISTRATOR OF SAID PERKY, DECEASED, ASSIGNOR, BY MESNE ASSIGNMENTS, TO THE SHREDDED WHEAT COMPANY, OF NIAGARA FALLS, NEW YORK.

PROCESS OF MANUFACTURING CEREAL FOOD.

1,064,164.  Specification of Letters Patent.  Patented June 10, 1913.

Application filed January 19, 1906. Serial No. 296,872.

*To all whom it may concern:*

Be it known that I, HENRY D. PERKY, a citizen of the United States, resident of Glencoe, in the county of Baltimore and State of Maryland, have made a certain new and useful Invention in Processes of Manufacturing Cereal Food; and I declare the following to be a full, clear, and exact description of the same, such as will enable others skilled in the art to which it appertains to make and use the invention.

Figure 1:
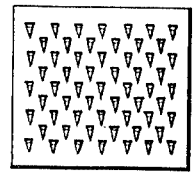
Figure 2:
Figure 3:

Figure 1 is a plan view of a plate which may be used in the process. Fig. 2 shows filaments. Fig. 3 is an enlarged view of a filament.

The invention relates to the reduction of cereals for food, and it consists in a new process of manufacture, as hereinafter set forth.

The object of this invention is to provide a tender and well cooked form of breakfast food from cereals, and particularly from corn or maize, and a process for manufacturing the same.

In describing the invention, it will be illustrated in its application to corn, which for this purpose is deprived of the hull by any ordinary means, and is reduced by grinding. The flour or meal, mixed with about an equal quantity of water or so much as it will take up in cooking, is placed in a vessel, which is then closed in a water-tight, or nearly water-tight manner. The vessel, with its inclosed content, is then immersed in boiling water or steam until the material is thoroughly cooked, when the content of the vessel will be in a manner set, because of the absorption of the water by the particles of the material, and their agglutination. This content on being left to stand will harden on cooling into cake form, having a degree of solidity which renders it available in this process. It is also thoroughly cooked. This material is then pressed through the perforations of a thin plate with a transverse or rubbing motion, causing cut-off shoots of the material to protrude. Perforated sheet tin may be used, or wire cloth, or a steel plate having perforations provided with thin, rasp-like or cutting margins. The perforations for the production of a very delicate and tender article should be of fine character, so that the resultant elongated forms or threads produced by the passage of the material through the perforations will be of small diameter, and therefore capable of being quickly dried.

The cake of material may be placed in a holder whereby it may be rubbed across the perforations of the plate with sufficient pressure to cause it to pass through the perforations with such speed as may be suitable to its consistency. Or, the cake may be held in a stationary manner, and motion given to the plate. In either case, the pressure required is designed to be put on the cake of material to feed it to the plate. Because of this rubbing, or reciprocating motion in pressing the material through the perforations, each form or filament produced thereby is an elongated accumulation of divers successive cut-portions or sections connected together by their cut faces. In this way, the product is rendered sectional or semi-jointed in character, tender, all the stiffer and larger articles being divided, so that its structure is more delicate than it would be if formed by direct pressure through a motionless or still plate. And, when the perforations are small, the material will be curved or curled lengthwise in the product. The curved filaments are light and are designed to be strong enough to hold their form without breaking down or agglomerating until dried. For this purpose they may be dropped through a heated flue, or may be collected on a receiver and dried in an oven. The filaments will dry rapidly and uniformly, because of their lightness and crenated form. This product is intended to provide a light, short and well cooked breakfast food, which consists purely of the grain, and is designed to have an inviting appearance.

Having described the invention, what I claim and desire to secure by Letters Patent is—

A process of reducing corn, which consists in cooking ground corn mixed with a limited amount of water, and cooling the resultant to a set or caked condition, pressing the material of the cake by a movement of reciprocation through a perforated plate and thereby forming separate light filaments thereof, drying these filaments in separated condition by causing them to fall or gravitate through a hot-air flue, and finally collecting the product.

In testimony whereof I affix my signature, in presence of two witnesses.

HENRY D. PERKY.

Witnesses:
 WM. C. BREED,
 L. S. BURBANK.